Aug. 14, 1956  R. S. KRAUSE ET AL  2,758,624
BILLFOLD OR WALLET
Filed Jan. 11, 1952  3 Sheets-Sheet 2
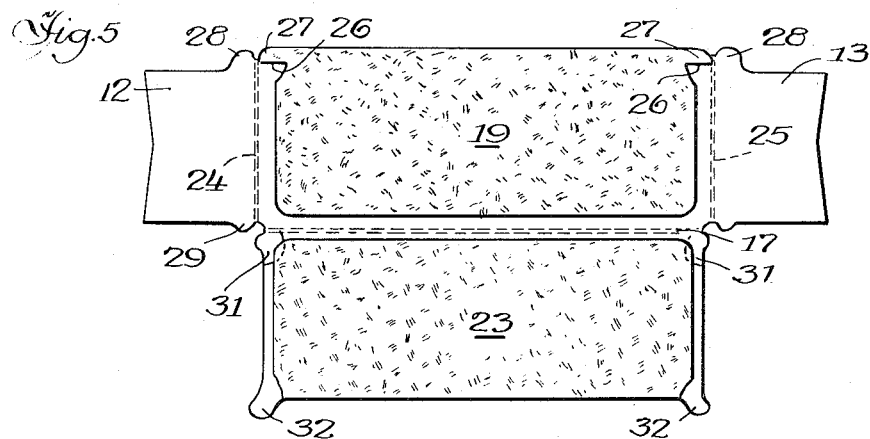
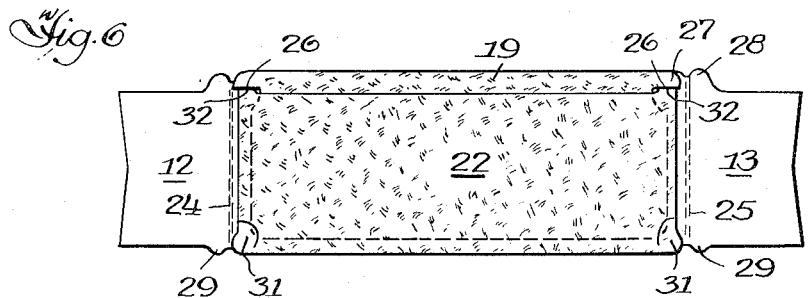
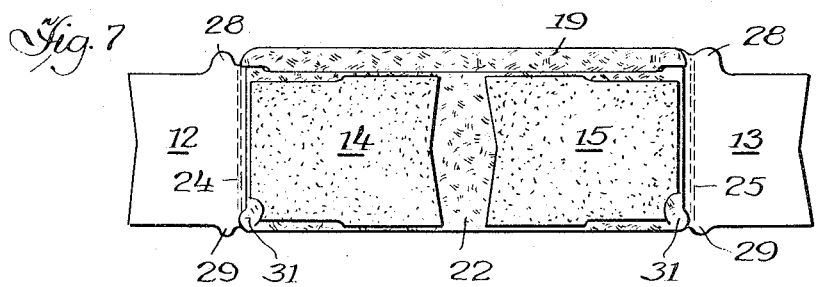
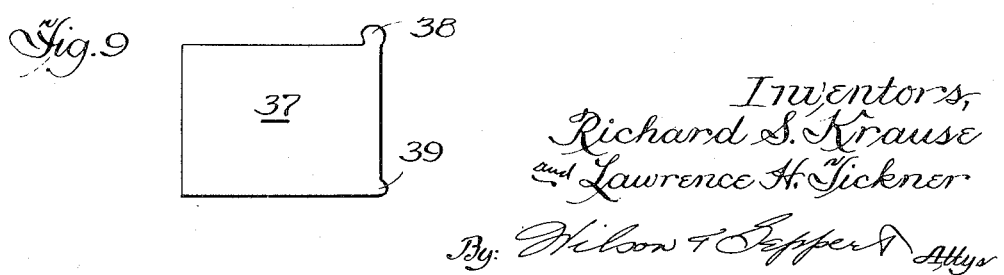
Inventors,
Richard S. Krause
and Lawrence H. Tickner
By: Wilson & Geppert Attys Aug. 14, 1956 R. S. KRAUSE ET AL 2,758,624
BILLFOLD OR WALLET
Filed Jan. 11, 1952 3 Sheets-Sheet 3
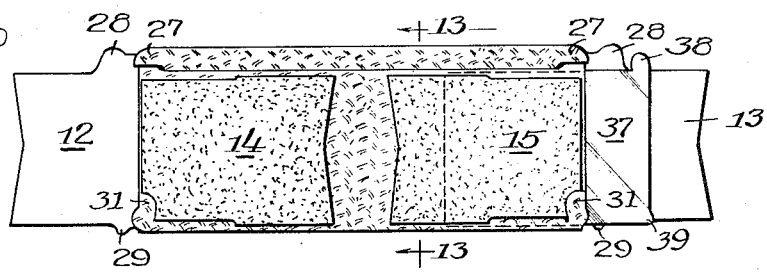
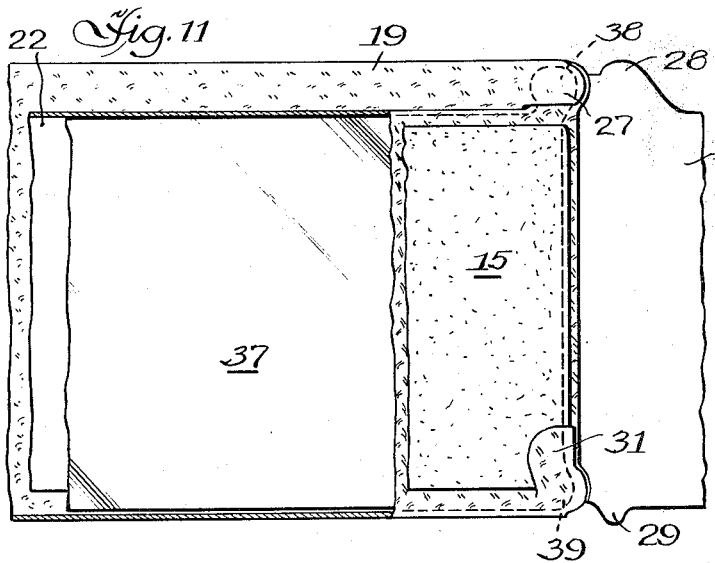
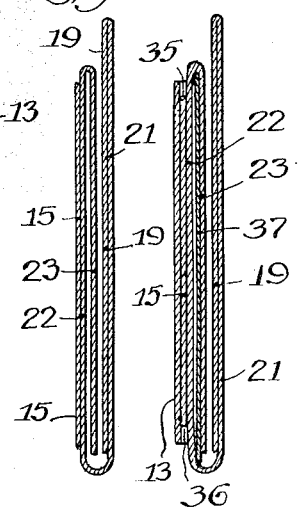
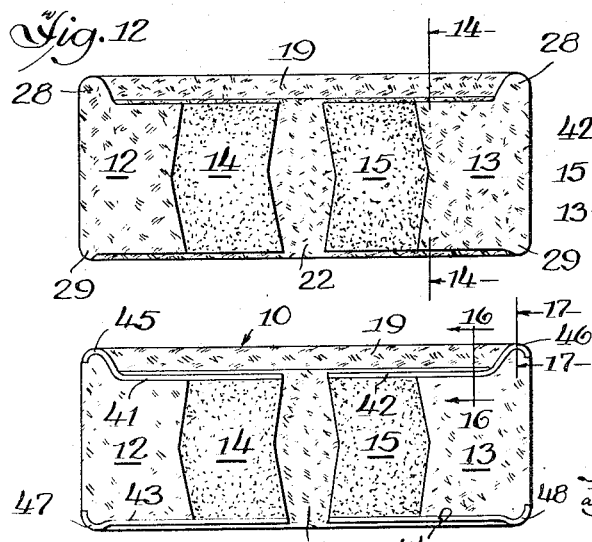
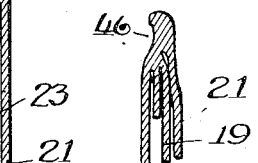
Inventors,
Richard S. Krause
and Lawrence H. Tickner,
By: Wilson & Geppert Attys.

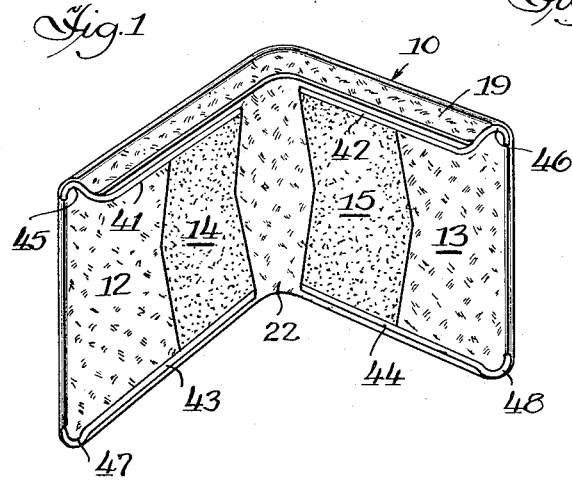
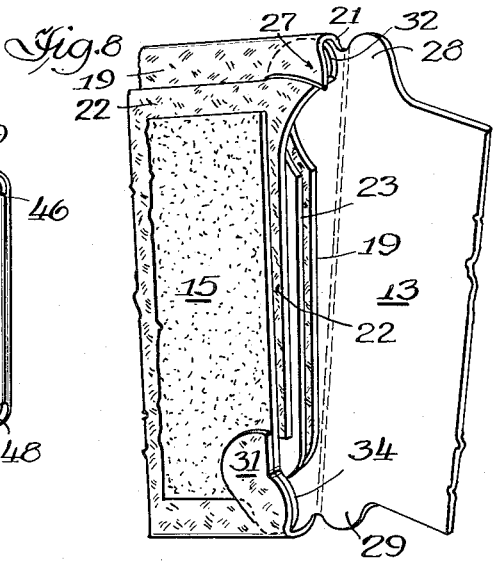
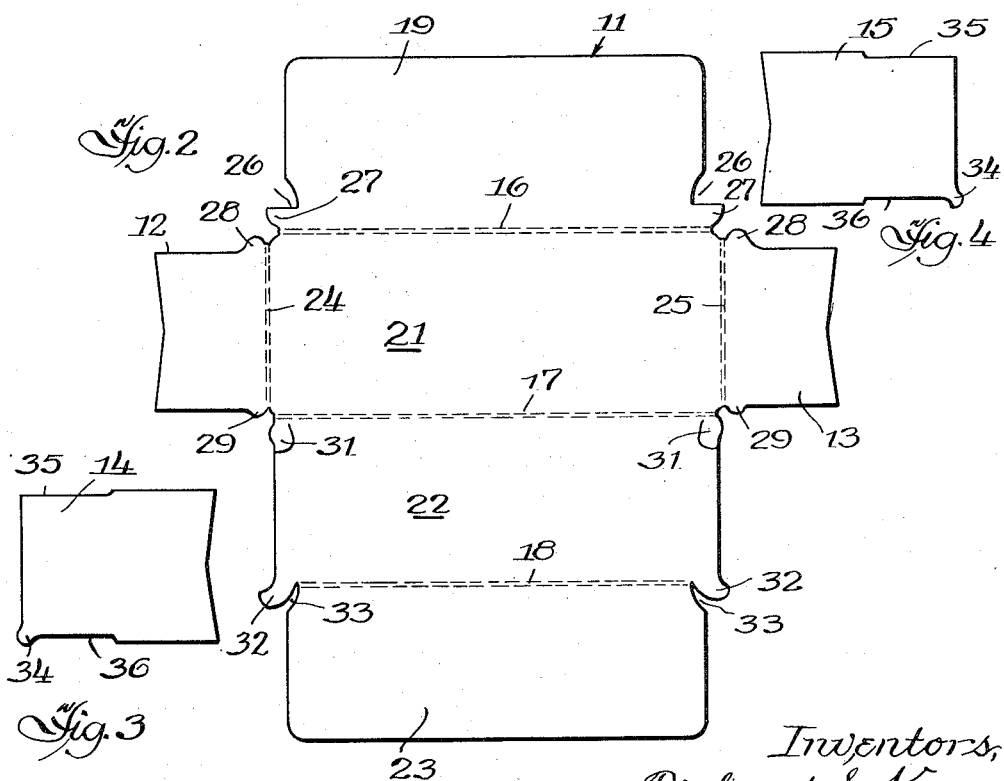

United States Patent Office 2,758,624
Patented Aug. 14, 1956

2,758,624

BILLFOLD OR WALLET

Richard S. Krause and Lawrence H. Tickner, Chicago, Ill., assignors, by mesne assignments, to Cory Corporation, a corporation of Delaware Application January 11, 1952, Serial No. 266,004

7 Claims. (Cl. 150—38)

The present invention relates to a novel article and to a novel means and manner of producing a billfold, wallet, secretary or the like from a vinyl plastic composition.

Billfolds or wallets have been formed of plastic compositions simulating leather, but such prior billfolds or wallets in their production are heat sealed along the outer or peripheral edge or in such manner that the resulting final product is provided with a rough and relatively sharp tear edge. Although such plastic composition suitable for use in the manufacture of billfolds or wallets is relatively supple and pliable at normal temperatures, it has the tendency to become more rigid when exposed to the cold so that these rough and relatively sharp peripheral edges during cold weather become more objectionable and are apt to cut or tear the skin or clothing upon contact.

It is an important object of the present invention to obviate the above objections by providing a novel billfold, wallet, secretary or the like of vinyl plastic composition having its peripheral or encompassing edges devoid of any relatively sharp or roughened edges.

Another important object of the present invention is the provision of a novel construction and means and manner of producing a billfold or wallet of vinyl plastic composition or the like simulating the various leathers of which such articles are generally made, the billfold or wallet being of folded construction and provided with twin secret pockets for receiving and retaining unexposed paper money or other valuable papers or documents.

Further objects are to provide a construction of maximum simplicity, efficiency, economy and ease of assembly and operation, and such further objects, advantages and capabilities as will later more fully appear and are inherently possessed thereby.

In the drawings:

Figure 1 is a view in perspective of the novel assembled billfold or wallet opened to show the pocket arrangement.

Fig. 2 is a plan view of the die cut body that is heat scored at the dotted lines, and Figs. 3 and 4 are plan views of two separate sections adapted to be affixed to the body to form side pockets.

Fig. 5 is a plan view of the body with the outer or top and inner or bottom sections folded inwardly to form two secret pocket sections of the body and showing the second step in the method and manner of assembly.

Fig. 6 is a plan view of the body and showing the next or third step in the method and manner of assembly, in which step the depending bottom or lower secret pocket section of Fig. 5 is folded upwardly and the protruding ears thereof are locked under the cut-out portions of the top or upper secret pocket of the body.

Fig. 7 is a view similar to Fig. 6 but showing the succeeding step with the two pocket sections shown in Figs. 3 and 4 located in position for assembly with the protruding ear of each located beneath the flaps at the bottom corners of the body.

Fig. 8 is an enlarged fragmentary view in perspective of the right-hand end of the assembly of Fig. 7 but before the parts have been joined.

Fig. 9 is a plan view of one of the metal plates employed in the dielectric sealing and final joining of the component parts of the assembly.

Fig. 10 is a plan view similar to Fig. 7 but showing the next step in the assembly operation and the manner of inserting one of the metal plates into one end of the secret pocket formed by the lower or inner fold, the plate being shown but partly inserted into one end of the pocket and it being understood another such plate is inserted into the other end of this secret pocket of the billfold or wallet, these plates being removed after final sealing has been effected.

Fig. 11 is an enlarged fragmentary plan view of the right hand end of billfold or wallet assembly with parts broken away to show the metal plate fully inserted into the secret pocket of the lower or inner fold.

Fig. 12 is a plan view of the billfold or wallet assembly after a metal plate has been completely inserted into each of the opposite ends of the secret pocket of the lower or inner fold, and with the end or side flaps folded inwardly to form the small pockets, the assembly being then ready for insertion into a form fitting fixture, clamped and the seams heat sealed.

Fig. 13 is an enlarged view in vertical cross section taken in a plane represented by the line 13—13 of Fig. 10.

Fig. 14 is an enlarged view in vertical cross section taken in a plane represented by the line 14—14 of Fig. 12.

Fig. 15 is a view similar to Fig. 12 but with the seams heat sealed to complete the assembly.

Figs. 16 and 17 are fragmentary enlarged views in vertical cross section taken in planes represented by the lines 16—16 and 17—17, respectively, of Fig. 15.

Referring more particularly to the disclosure in the drawings and to the novel illustrative embodiment disclosed therein, the present billfold or wallet is formed of a vinyl plastic composition or the like of the type that can be produced in various colors and made to simulate various types and kinds of leather, textures or patterns usually employed in the production of billfolds or wallets.

The novel assembled billfold or wallet 10 (Figs. 1 and 15) comprises a die cut body 11 having side flaps 12 and 13 (Fig. 2), and separately formed pockets or pocket members 14 and 15 to be later joined by dielectric sealing which heat seals the seams. Unlike prior forms of billfolds or wallets formed of plastic composition, the present article is free or devoid of any tear edges forming relatively sharp and rough peripheral edges that may cut or tear the skin or clothing and are otherwise objectionable.

To eliminate the inherent objections to such prior articles, both as to construction and appearance, the present invention comprehends providing a smooth and uniform fold along the peripheral edges. To accomplish this the body 11 is heat scored at the dotted parallel lines 16, 17 and 18 to form and space parallel sections 19, 21, 22 and 23, and is also heat scored along the transversely extending lines 24 and 25 for spacing and permitting folding of the side flaps 12 and 13 inwardly from the section 21. To facilitate joining and interengagement of the component parts of the billfold or wallet, the outer section 19 is cut away at each end at 26 and provided adjacent thereto with a tongue or projection 27 disposed adjacent the score line 16 and the intermediate section 21.

The flaps 12 and 13 on the ends of the intermediate section 21 are each provided with an upper ear or projection 28 and a lower and somewhat smaller ear or projection 29 adjacent the score lines 24 and 25. The intermediate section 22 is formed in the die cutting operation with a small flap 31 at each end adjacent the score line 17 and with projecting ears or tongues 32 at the ends of the score line 18 and adjacent thereto with a cutout 33. It will be apparent from Fig. 2 that the upper or outer section 19 and the lower or inner section 23 are of somewhat less length than the intermediate sections 21 and 22.

The separately formed pockets 14 and 15 (Figs. 3 and 4) which are later joined to the body or blank 11, are each shown as formed at one end with an ear or projection 34 with the opposite edges cut away at 35 and 36 to thereat reduce the width.

In the assembly of the body or blank 11 and the integrally formed side flaps 12 and 13 with the separately formed side pockets 14 and 15, the first step is shown in Fig. 5 where the outer or upper section 19 and the lower or inner section 23 of the body or blank are folded inwardly along their score lines 16 and 18 to form two secret pockets to which access can only be had after the billfold or wallet has been assembled by withdrawing these sections 19 and 23 from the interior of the billfold or wallet.

The next step is disclosed in Fig. 6 in which the body or blank is further folded along the score line 17 whereby the bottom or lower secret pocket section 23 as shown in Fig. 5 is folded upwardly onto the top or upper secret pocket section 19. In such folding the protruding ears 32 of the intermediate section 22 are locked under the cutouts 26 of the top secret pocket section 19.

The next or succeeding step as shown in Fig. 7 is to insert and locate the separately formed side pockets 14 and 15 upon the body or blank folded as in Fig. 6, with the ears or projections 34 of the separate left and right hand side pockets located beneath the flaps 31 of the intermediate section 22.

With the component parts folded into the assembly shown in Figs. 7 and 8, a metal plate 37 (Fig. 9) is inserted into the interior of and at each end of the lower or inner secret pocket between the folded sections 22 and 23 and beneath the ears or projections 27 on the outer or upper secret pocket section 19 as shown in Figs. 10 and 11, with the latter view showing one of the plates inserted into its proper position for heat sealing the assembly. After these plates have been inserted with the tongue or projection 38 and the ear or projecting end 39 (Figs. 9 and 10) of each inserted in the manner shown in dotted outline in Fig. 11, the flaps 12 and 13 are then folded to the position shown in Fig. 12. Next the entire assembly is inserted into a form fitting fixture, clamped in position and the seams heat sealed.

This sealing is accomplished by dielectric sealing along the double lines or seams shown at 41, 42, 43 and 44. Except at the rounded corners 45, 46, 47 and 48 where the seal extends to approximately the peripheral edge of the billfold or wallet to join the ears or projections 27, 32 and 28 adjacent the upper edge of the billfold or wallet, and the flaps 31 and ears 29 at the lower edge thereof, the seams joining the separate pockets 14 and 15 and the flaps 12 and 13 to the intermediate section 22 of the blank or body are spaced inwardly from the folded edges of the body. Thus the resulting assembly contains no tear edges or rough or serrated corners that could cut or damage the fingers or clothing and a most effective sealing is accomplished with all exposed edges composed of folds or multiple thicknesses of material devoid of any sharp or rough edges.

It will be noted that the tongues, ears or projections on the adjoining sections and flaps are so arranged and contoured in such manner as to assure proper registry of the overlapping parts upon assembly. Furthermore, it will be noted that the arrangement of the locking corners is such as to effect a positive interlocking between the assembled parts resulting in a most effective seal and eliminating all danger of raw edges about the periphery.

From the above description and the disclosure in the drawings, it will be readily apparent that the novel assembled billfold or wallet is provided with the usual upwardly opening pocket extending for approximately the length of the billfold or wallet, a pair of secret pockets opening into the previously mentioned pocket and to which access is had only by withdrawing the closures therefor formed by the inturned pocket sections 19 and 23, a pair of side pockets formed by the pocket members 14 and 15, and a pair of relatively small pockets formed by the inturned flaps 12 and 13.

By reason of the novel means and manner of forming the present billfold or wallet, it will be apparent that the resulting article is provided with a smooth peripheral edge consisting of a folded portion thus providing a double thickness throughout. This billfold or wallet produced in the manner disclosed is durable and long wearing, is highly resistant to scuffing or cracking, is unaffected by moisture or stain-producing liquids, remains soft and pliable or flexible and readily conforms to the pocket and body contour.

Having thus disclosed the invention, we claim:

1. A billfold or wallet of plastic composition comprising a substantially rectangular blank scored to provide four parallel sections forming the exterior and interior walls of the blank, the two outer sections being inturned and forming continuous secret pockets and a flap projecting from each of the opposite ends of one of the intermediate sections providing relatively shallow pockets when folded inwardly, two separate substantially rectangular parts joined to the interior wall of the blank and disposed between it and the inturned flaps, these parts each being of a length less than one-half that of the interior wall and with the adjacent ends of said parts spaced apart and these ends open to provide two spaced pockets, interlocking projections on adjacent corners on an outer and on an intermediate section for joining the sections, pockets and flaps, and a heat sealed seam joining the corners and the separate pockets and flaps to the interior wall of the blank with the seam disposed inwardly of the folded edge of said interior wall.

2. A billfold formed of a pliable plastic composition comprising a body of substantially rectangular shape except for a pair of oppositely projecting flaps adapted to be folded inwardly onto the body, said body being heat scored to provide longitudinally and transversely extending permanent folds dividing the flaps from the body and the body into four parallel, connected and continuous sections providing the exterior and interior walls of the billfold with the two outer sections of the body inturned and forming secret pockets with one of said flaps projecting from each of the opposite ends of the exterior wall and each flap providing a shallow pocket, two separate members disposed upon the interior wall of the body between the interior wall and said flaps with said members each being of a length less than one-half that of the interior wall and with the adjacent ends of said members spaced apart and open to provide two spaced pockets, interlocking projections on the interior wall on an inturned section and on the flaps for interlocking engagement at the corners of the billfold, and a heat sealed seam uniting the corners and the separate pocket members and flaps to the interior wall of the billfold with said seam disposed along a line spaced from the folded edge of said interior wall.

3. A billfold composed of a flexible plastic composition and comprising a blank longitudinally heat scored along spaced parallel lines to provide folds between four parallel, connected and continuous sections and transversely heat scored to provide two outwardly projecting end flaps with an end flap projecting from each of the opposite ends of an intermediate section, the outer sections of which are folded inwardly along the scores to provide secret pockets and the two intermediate sections when folded upon each other along the scores providing the interior and exterior walls of the billfold with the outwardly projecting end flaps being on the section providing the exterior wall, and these end flaps folded inwardly, a separate member overlying each of the opposite ends of the section providing the interior wall with each member disposed between the interior wall and one of said flaps, each member being of a length less than one-half that of the interior wall and with the adjacent ends of said members spaced apart and these ends open to provide two spaced pockets and each flap when folded inwardly onto the separate pocket members provides an additional pocket, interlocking projections on an outer section, on the section providing the interior wall and on the end flaps with said projections interlocking at the corners of the assembly, and a heat sealed seam connecting the corners, the flaps and the members to the interior wall section along a line spaced inwardly of the folded edge of said section providing the interior wall.

4. The method of forming a billfold of a plastic composition including a blank providing the body and two separate pockets, comprising the steps of die cutting the blank to form a substantially rectangular body and two integral end flaps with each provided with corner projections, heat scoring the body to form four parallel sections and the two end flaps each foldable inwardly along the score lines, folding the top and bottom sections of the body inwardly onto the intermediate sections with the intermediate sections forming the interior and exterior of the body and said top and bottom sections forming a pair of secret pockets, interlocking the corner projections of these pockets, forming two separate pockets each with a projection at one corner, placing the separate pockets onto the section forming the interior of the body and interlocking the projection at a corner of each to the interior section, folding the end flaps inwardly along the score lines onto the separate pockets with the corner projections thereof overlapping the interlocking corners, and heat seaming the interlocking corners and the adjoining edges of the flaps and separate pockets to the interior section of the body to join the assembly into an integral billfold with the heat seam disposed inwardly of the folded edge of the interior section.

5. The method of forming a billfold of a flexible plastic material from a blank of such material and two separate pocket sections joined together by a heat seam, comprising the steps of die cutting the blank to form a substantially rectangular body and two integral end flaps with each provided with projections adapted to be folded into overlapping registry, heat scoring the body to form four parallel sections and dividing the two end flaps from the body with each of the parallel sections and the end flaps foldable inwardly at the score lines, folding the top and bottom sections of the body inwardly along the score lines onto the intermediate sections with the intermediate sections forming the interior and exterior sides of the body and these top and bottom sections forming a pair of secret pockets interlocked at their opposite corners by their adjoining projections, forming two separate pockets each with a projection at one corner, placing the separate pockets onto the section forming the interior of the body and interlocking the adjoining projections on the body and the separate pockets, folding the end flaps inwardly along their score lines onto the separate pockets with the projections on the end flaps overlapping the corners of the assembly, and heat seaming the corners and the upper and lower edges of the flaps and the separate pockets to the interior side of the billfold to join the assembly into an integral unit with the heat seam disposed inwardly of the folded edge of the interior side of the billfold.

6. The method of forming and assembling a billfold formed of a plastic material, comprising the steps of die cutting a blank of said material to provide a body part with interlocking corners and a flap projecting outwardly from the opposite sides of the body and provided with projections adjacent the body part, die cutting two extra pockets with each pocket provided with a projection at one corner, heat scoring the blank along parallel lines to divide the body into four parallel sections with the end sections providing secret pockets and the intermediate sections providing the exterior and interior sides of the billfold when folded along the scoring, heat scoring the blank between each flap and the body, folding the end sections of the blank inwardly along the scoring to provide a secret pocket for the exterior side and secret pocket for the interior side of the billfold, interlocking the corners of the folded sections, positioning each extra pocket upon the interior side of the billfold with its projection interlocking with a corner of the inner secret pocket, folding each flap inwardly along its scoring and onto its respective extra pocket with its projections overlapping the corners of the assembly, and heat sealing the corners and the extra pockets and flaps to the interior side of the billfold to join the assembly into an integral billfold with the heat seal spaced from the folded edge of the interior side.

7. The method of forming and assembling a billfold formed of a plastic material, comprising the steps of die cutting a blank of said material to provide a body part, a flap projecting outwardly from the opposite sides of the body, two separate pockets and overlapping and interlocking projections on the body part, flaps and separate pockets, heat scoring the blank along parallel lines to divide the body into four parallel sections with the two outer sections providing secret pockets and the two intermediate sections providing the outer and inner walls of the billfold, heat scoring the blank between each flap and the body, folding the outer sections of the blank inwardly along the score lines to provide a pair of secret pocket sections and then folding these pocket sections into overlapping relation to provide the usual upwardly opening pocket extending for substantially the length of the billfold, interlocking the projections on these pocket sections, placing the separate pockets onto the pocket section forming the interior of the body with the projection on each separate pocket interlocking with the interior of the body, folding each flap inwardly along its score line and onto its respective separate pocket with the projections of each flap overlapping the adjacent corners of the assembly, and heat sealing the interlocking corners and the separate pockets and flaps to the inner wall of the billfold to join the assembly into an integral unit with the heat seal spaced from the folded edge of the inner wall.

References Cited in the file of this patent

UNITED STATES PATENTS

| Number | Name | Date |
|---|---|---|
| 1,679,807 | Bohl | Aug. 7, 1928 |
| 2,294,635 | Sherwood | Sept. 1, 1942 |
| 2,348,287 | Fiekers | May 9, 1944 |
| 2,353,222 | Collbroth | July 11, 1944 |
| 2,481,602 | Lindh | Sept. 13, 1949 |
| 2,498,820 | Ogg | Feb. 28, 1950 |
| 2,505,994 | Sahula | May 2, 1950 |
| 2,576,826 | Dobbs et al. | Nov. 27, 1951 |
| 2,587,033 | Dobbs et al. | Feb. 26, 1952 |
| 2,647,071 | Schade | July 28, 1953 |
| 2,701,223 | Marcus | Feb. 1, 1955 |